United States Patent
Hasegawa

(10) Patent No.: US 6,515,755 B1
(45) Date of Patent: Feb. 4, 2003

(54) IMAGE FORMING APPARATUS, SYSTEM, AND METHOD HAVING AN ANTI-COUNTERFEITING FUNCTION

(75) Inventor: Yutaka Hasegawa, Nakano-ku (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/272,129

(22) Filed: Mar. 19, 1999

(30) Foreign Application Priority Data

Mar. 19, 1998 (JP) .......................................... 10-070379

(51) Int. Cl.$^7$ ........................ B41B 15/00; G03G 21/00; B42D 15/00
(52) U.S. Cl. ....................... 358/1.14; 399/366; 283/902
(58) Field of Search ................................ 358/1.1, 1.14, 358/1.16, 1.18, 296; 382/100, 135, 137; 399/366; 283/113, 902

(56) References Cited

U.S. PATENT DOCUMENTS

| | | | |
|---|---|---|---|
| 5,375,886 A | * 12/1994 | Tsuchiya | 283/902 |
| 5,418,602 A | * 5/1995 | Nishikawa | 283/902 |
| 5,481,378 A | * 1/1996 | Sugano et al. | 283/902 |
| 5,610,688 A | * 3/1997 | Inamoto et al. | 399/366 |
| 5,647,010 A | * 7/1997 | Okubo et al. | 399/366 |
| 6,305,718 B1 | * 10/2001 | Kendrick | 283/902 |
| 2002/0012444 A1 | * 1/2002 | Nishikawa et al. | 382/100 |

FOREIGN PATENT DOCUMENTS

| | | |
|---|---|---|
| JP | 7-23218 | 1/1995 |
| JP | 7-44341 | 2/1995 |
| JP | 7-47717 | 2/1995 |
| JP | 7-89272 | 4/1995 |
| JP | 7-123249 | 5/1995 |
| JP | 7-288681 | 10/1995 |
| JP | 8-2010 | 1/1996 |
| JP | 8-324074 | 12/1996 |
| JP | 9-508246 | 8/1997 |

OTHER PUBLICATIONS

U.S. patent application Ser. No. 09/272,129, filed Mar. 19, 1999, pending.
U.S. patent application Ser. No. 09/408,127, filed Sep. 29, 1999, pending.

(List continued on next page.)

Primary Examiner—Kimberly A. Williams
(74) Attorney, Agent, or Firm—Oblon, Spivak, McClelland, Maier & Neustadt, P.C.

(57) ABSTRACT

An image forming apparatus for use in a network system including a network and a plurality of print-data-outputting apparatuses which sends via the network print-data including identification information identifying the print-data-outputting apparatus to the image forming apparatus for outputting a hardcopy of the print-data. The image forming apparatus receives print-data from each of a plurality of print-data-outputting apparatuses via the network, recognizes characteristics of the received print data, and judges whether reproduction of the received print-data is legally forbidden. If the received print data is forbidden, the image forming apparatus alters the received print-data so as to cause the fidelity of a reproduction of the received print-data to be lost or deteriorated and adds to the altered print-data identification information identifying the specific print-data-outputting apparatus sending the print-data. An image of the altered print-data and an image of the added identification information is printed on a sheet of paper and output as a hardcopy. A computer readable medium stores instructions for controlling an image forming apparatus used in a network system including a network and at least one print-data-outputting apparatus which sends via the network print-data including identification information identifying the print-data-outputting apparatus sending print-data to the image forming apparatus for outputting a hardcopy of the print-data.

30 Claims, 10 Drawing Sheets

OTHER PUBLICATIONS

U.S. patent application Ser. No. 08/957,737, filed Oct. 24, 1997, pending.

U.S. patent application Ser. No. 09/272,129, filed Mar. 19, 1999, pending.

* cited by examiner

IMAGE FORMING APPARATUS, SYSTEM, AND METHOD HAVING AN ANTI-COUNTERFEITING FUNCTION

CROSS REFERENCE TO RELATED APPLICATION

This application claims benefit of priority under 35 U.S.C. Section 119 of Japanese patent application No. 10-070379 filed in the Japanese Patent Office on Mar. 19, 1998 and the entire contents of which are hereby incorporated by reference.

BACKGROUND OF THE INVENTION

1. Field of the Invention

The present invention relates to an electrophotographic image forming apparatus, such as, a color photocopier or a color printer, that is used in a network system as a shared-printer for a plurality of print-data-outputting apparatuses, such as client-computers or image scanners, and more particularly to an image forming apparatus having an anti-counterfeiting function for articles whose reproduction is forbidden by law, such as, paper currency bills, securities, postage stamps, and so forth.

2. Discussion of the Background

Current image forming apparatuses, such as, a color photocopier or a color printer, are capable of producing a counterfeit article whose reproduction is forbidden by law, such as, paper currency bills, securities; and so forth. Therefore, it is desired to provide an image forming apparatus with functionality of recognizing an article whose reproduction is forbidden by law, and inhibiting an ordinary reproduction thereof In particular, when an image forming apparatus is used in a network system as a shared-printer, it is desired that the apparatus determine if print-data, which has been sent via a network from one of the client-computers or image scanners as a print-data-outputting apparatus includes data for an article whose reproduction is forbidden by law, and take action to prevent the ordinary reproduction of the print-data if the print-data includes data of such an article.

Japanese Laid-open Patent Publication No. 23218/1995 describes a color printer which includes a data receiving device, a memory storing a plurality of data relating to specific articles whose reproduction is forbidden by law, such as paper currency bills, and means to apply a predetermined image-processing function to received data when the received data coincides with one of data stored in the memory, so as to cause the reproduction of the received data to be black or altered.

Japanese Laid-open Patent Publications No. 47717/1995, 123249/1995, 288681/1995, and 2010/1966, describe anti-counterfeiting devices, in which received print-data is judged according to whether reproduction of the print-data is forbidden by law, and if so the print-data is altered, and the altered print-data is outputted.

Generally, a printer or a digital photocopier can be connected to a network system, besides being used as a stand-alone apparatus, for use as a shared-image-outputting-device of the network system. A digital photocopier may also function as a network shared-image-inputting-device as well. A shared-image-outputting-device and a shared-image-inputting-device are often referred to as a shared-printer and a shared-scanner, respectively. A network system generally includes an arbitrary number of client-computers, server-computers, shared-printers, and shared-scanners, and is configured so that, every client-computer or shared-scanner may be used as a print-data-outputting apparatus by outputting print-data to one of the network's shared-printers in order to output a hardcopy of the print-data. Therefore, if and when the printing device outputs a hardcopy of a specific article, such as paper currency bills or securities, whose reproduction is legally forbidden, the fidelity of the reproduction is lost by alteration of the article's print-data so that the hardcopy can be easily recognized as an illegal reproduction. Also, the identity of the client-computer which outputted print-data for an article whose reproduction is legally forbidden or the network system user who intentionally or unintentionally attempted such an illegal reproduction, cannot be readily recognized from such a hardcopy.

SUMMARY OF THE INVENTION

The present invention has been made in view of the above-discussed problems and an object of the invention is to provide an image forming apparatus for use within a network system, wherein upon receiving print-data legally forbidden for reproduction from a print-data-outputting apparatus of the network system, the image forming apparatus prints in an altered paper reproduction of an image which indicates the identification code of the specific print-data-outputting apparatus which sent the print-data, such that the print-data-outputting apparatus which attempted illegal reproduction is easily recognized from the hardcopy.

Another object of the present invention is to provide an image forming apparatus able to prevent the reproduction of any print-data received from a print-data-outputting apparatus, which has output print-data whose reproduction is illegal, regardless of the legitimacy of reproduction of the later received print-data.

A preferred embodiment of the present invention comprises an image forming apparatus for use in a network system including a plurality of print-data-outputting apparatuses, each of which is able to send via the network print-data including information regarding the identity of the print-data-outputting apparatus to an image forming apparatus for outputting a hardcopy reproduction of the print-data. The image forming apparatus includes a print-data-receiving device configured to receive print-data from each of the plurality of network print-data-outputting apparatuses, a judging device configured to determine whether or not reproduction of the received print-data is legally forbidden by recognizing characteristics of the received print-data, an image-processing device configured to alter any forbidden print-data received so as to cause the fidelity of the reproduction of the forbidden print-data received to be lost or deteriorated, and to add to the altered print-data identification information regarding the identity of the specific print-data-outputting apparatus sending forbidden print-data, a control device configured to activate the image-processing device when the judging device determines that legally forbidden print-data has been received in a request for reproduction, so as to alter the forbidden print-data received and to add to the altered print-data identification information regarding the identity of the print-data-outputting apparatus sending the forbidden print-data, and a printing device that prints an altered image reproduction of the print-data and added identification information on a sheet of paper output as a hardcopy.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
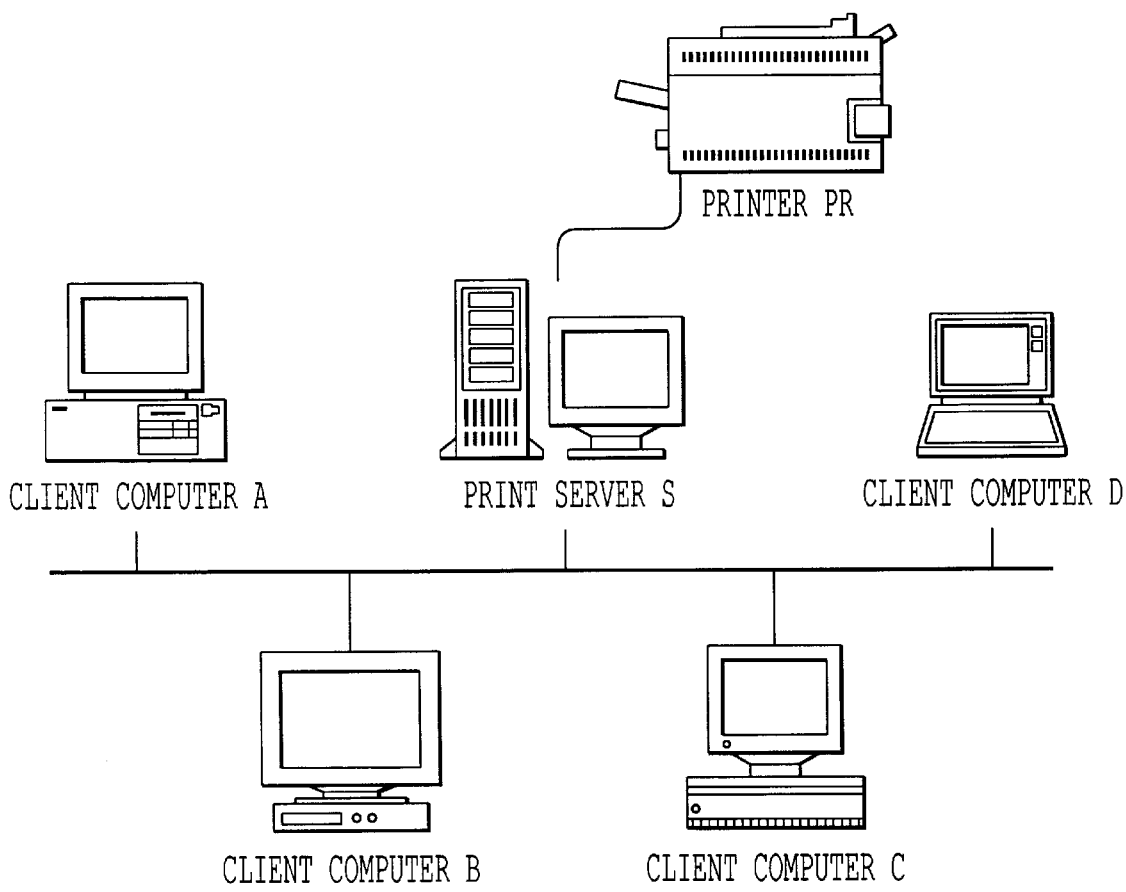
FIG. 1 is a schematic diagram illustrating an exemplary network system, including a printer, as an example of an image forming apparatus according to an embodiment of the present invention.

Referring now to the drawings, wherein like reference numerals designate identical or corresponding parts throughout the several views, and more particularly to FIG. 1 thereof.

Other features of the invention will become apparent in the course of the following descriptions of exemplary embodiments which are given for illustration of the invention and are not intended to be limiting thereof.

Obviously, numerous modifications and variations of the present invention are possible in light of the above teachings. It is therefore to be understood that within the scope of the appended claims, the invention may be practiced otherwise than a specifically described herein.

FIG. 1 is a diagram illustrating an exemplary network system including a printer as an example of an image forming apparatus according to the present invention. The network system includes a network N, a printer PR, a print-server S, and four client-computers A, B, C, and D. Each of the print-server S and client-computers A, B, C, and D may be a personal computer or a mini-computer. Any of the four client-computers A, B, C, and D can function as a print-data-outputting apparatus that is capable of sending print-data to the printer PR, through the network N via the print-server S, to print out a hardcopy according to the print-data.

Figure 2:
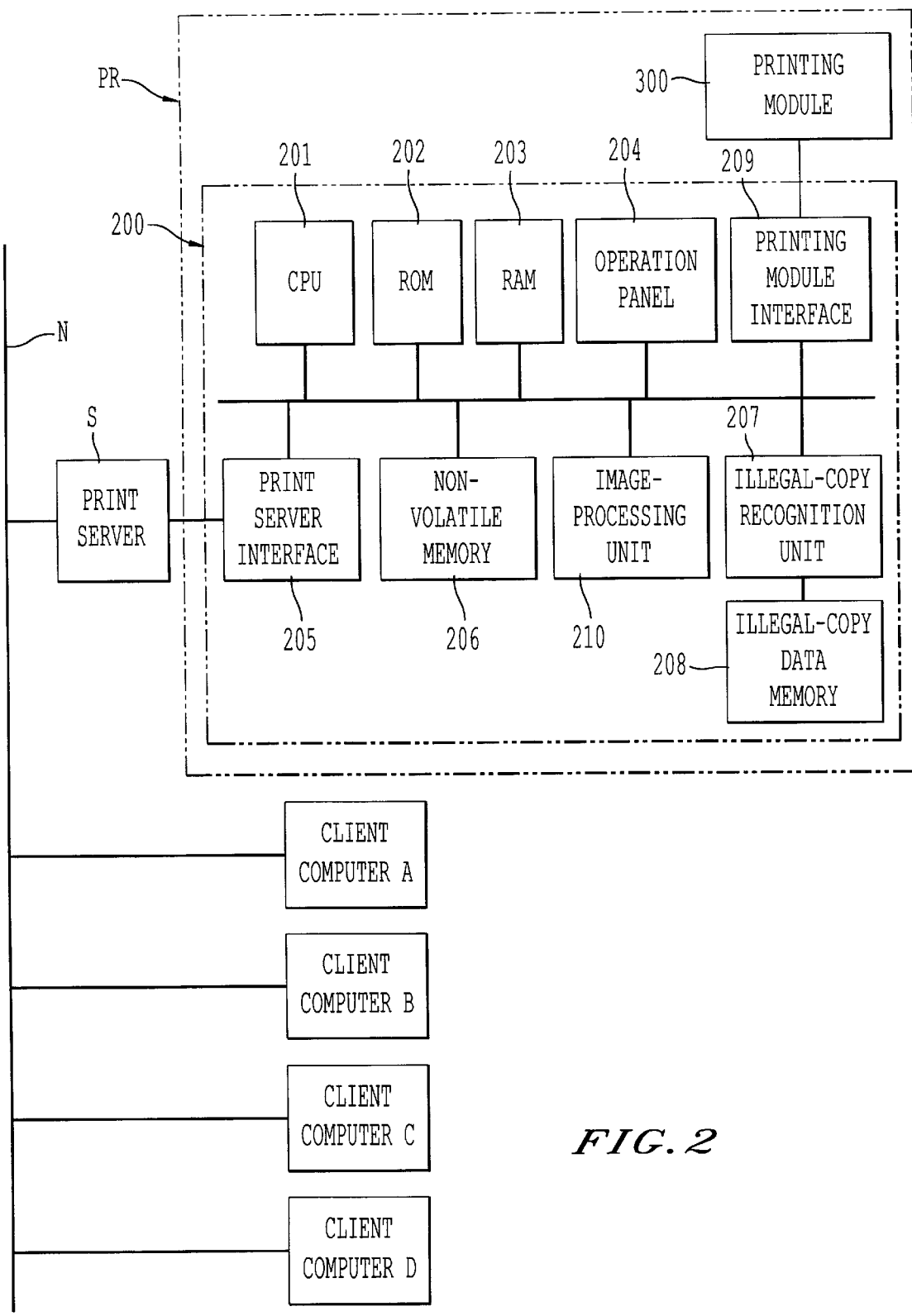
FIG. 2 is a block diagram illustrating the structure of a control module of the printer shown in FIG. 1.

FIG. 2 illustrates the structure of the printer PR. The printer PR includes a control module 200, and a printing module 300 as an image-forming device. The control module 200 converts print-data, which has been received from one of the client-computers A, B, C, or D via the network N and the print-server S, into image data, and then transmits the image data to the printing module 300. The printing module 300 prints an image on a paper according to the image data sent from the control module 200 and then outputs the printed paper, as a hardcopy of the print-data, to the outside of the body of the printing module 300.

Referring to FIG. 2, the control module 200 includes a central processing unit (CPU) 201, a read only memory (ROM) 202, a random access memory (RAM) 203, an operation panel 204, a print-server-interface circuit 205, a non-volatile memory 206, an illegal-copy-recognition unit 207, an illegal-copy-data memory 208, a printing module interface circuit 209, and an image-processing unit 210. The CPU 201 integrally controls these units, other devices implemented in the control module 200 and the printing module 300 by executing programs in the ROM 202.

The ROM 202 contains program codes or instructions for the program the CPU 201 executes and fonts data. The ROM 202 can be replaced by a rewritable medium such as a hard disk or a flash memory so that the program can be easily upgraded.

The RAM 203 functions as a work memory for the CPU 201. A part of the RAM 203 is allocated as a buffer memory for temporarily storing print-data transferred from one of the client-computers A, B, C, or D, and also for temporarily storing image data, which has been converted from print-data, so that the image data may be sent to the printing module 300 for printing.

The operation panel 204 includes a displaying device to indicate an operation status of the printer PR and an input device for an operator to input operation commands.

The print-server-interface circuit 205 functions as a print-data-receiving device for receiving print-data via the network N. In the preferred embodiment, the circuit 205 exchanges command and status data with the print-server S and receives from the print-server S print-data to be printed out by the printing module 300. The server interface circuit 205 is also capable of directly connecting to the network N, omitting the print-server S, when the number of print jobs, which have to be simultaneously processed by the control module 200, is limited, such as, for example, less than five print jobs.

The non-volatile memory 206 stores a record of the printing of print-data, including the identification code of the print-data-outputting apparatus which transmitted the print-data, the legitimacy of the print-data, and the user identification code that is logged in the client-computer transmitting the print-data when the print-data is transmitted. The record of printing any print-data which is judged by the illegal-copy-recognition unit 207 as legitimate and legally allowed to be reproduced, as described later, can be deleted after reproduction of the print-data. The non-volatile memory 206 may also store data for setting parameters of the printer PR for each printer, such as, for example, data for selecting one of a plurality of paper trays to be used for printing when print-data does not include an explicit designation for one of a plurality of paper trays. The non-volatile memory 206 can be structured by a semiconductor memory such as a flash memory or a hard-disk drive.

The illegal-copy-recognition unit 207 functions as a judging device for determining whether reproduction of the print-data is legally forbidden. The illegal-copy-recognition unit 207 first recognizes the characteristics of print-data stored in the RAM 203, judges whether it is legally forbidden for the stored print-data to be printed on paper referring to the data stored in the illegal-copy-data memory 208, and then sends the result of the judgement to the CPU 201.

The illegal-copy-data memory 208 preliminarily stores data on characteristics of articles whose reproduction is legally forbidden, such as paper currency bills and securities. The data characteristics of each article includes, for example, image data of the article and attribute data of the article, such as an identification code number, the category, and the size of the article. The illegal-copy-data memory 208 can be a semiconductor memory, such as a flash memory, or a hard-disk drive.

The printing module interface circuit 209 exchanges command and status data with the printing module 300 and transmits image data to the printing module 300 for printing.

The image-processing unit 210 converts print-data into image data including a plurality data of picture elements or pixels. Each of the pixel data includes data for defining the characteristics of each pixel, such as the composition of the primary colors of each pixel. After the conversion of print-data into image-data, the image-processing unit 210 temporarily stores the data of the pixels in the RAM 203. In addition, when it is judged by the illegal-copy-recognition unit 207 that reproduction of the print-data is legally forbidden, the image-processing unit 210 alters the print-data in the RAM 203 so as to cause the fidelity of the reproduction of the print-data to be lost or deteriorated, and adds the identification code of the client-computer, which sent the print-data. The above described alteration of the print-data is processed such that the fidelity of the reproduction of the print-data is lost or deteriorated, however, preferably to a degree that anyone can recognize the reproduced image, i.e., the image of the article that is forbidden to be reproduced. In order to achieve the alteration of the print-data as described above, the image-processing unit 210 utilizes various kinds of image-processing, such as, for example, color changing, softening of image sharpness, mosaic-processing, and painting the whole image with a single color.

Each article print-data includes, for example, image data, graphic data, character and/or letter strings data, and control data. The image data includes a plurality data of picture elements or pixels. The graphic data includes data for defining the characteristics of varies geometric figures, such as, "circle", "line", "rectangle", and so forth. The character and/or letter strings data includes, for example, data for strings of character codes and attribute data, such as, data for font, the position, the size, and the color for each of the character codes. The control data includes, an identification code of the client-computer that sends the print-data, the user identification code that is logged in the client-computer sending the print-data, and command data.

Figure 3:
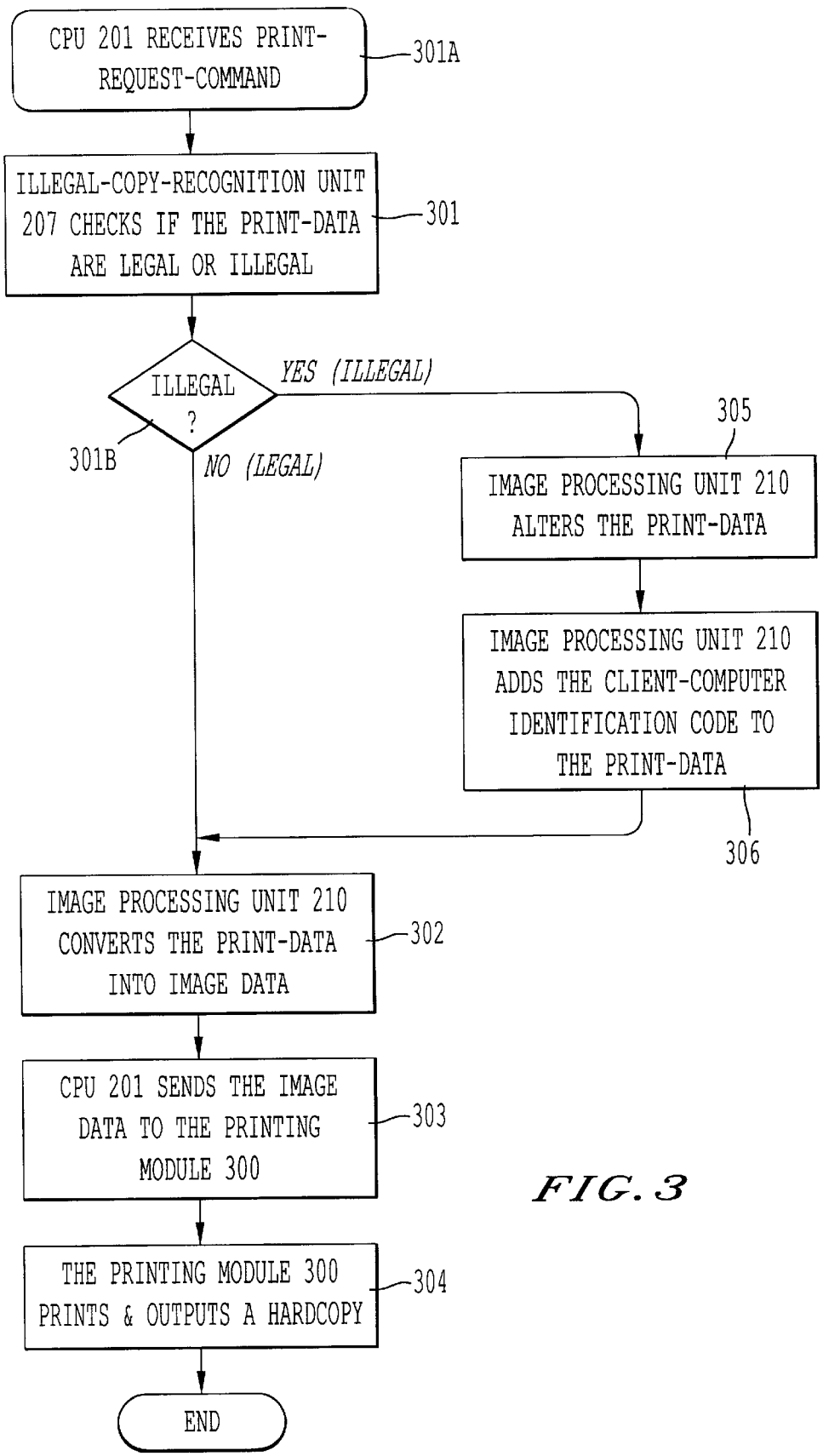
FIG. 3 is a flowchart illustrating an exemplary operation of the control module according to an embodiment of the present invention for altering print-data when reproduction of the print-data is legally forbidden.

FIG. 3 illustrates an exemplary operation of altering print-data, when reproduction of the print-data is legally forbidden, so as to lose the fidelity of the reproduction. The operation is invoked by the control module 200 when the control module 200 receives print-data accompanied by a print-request-command from one of the client-computers A, B, C, or D as a print-data-outputting apparatus. The print-data includes at least the identification code of the client-computer sending the print-data and the user identification code, as described above. The control module 200 temporarily stores the data in a predetermined allocated area of the RAM 203.

Referring to FIG. 3, in step 301, the CPU 201 first activates the illegal-copy-recognition unit 207 so as to verify the print-data in the RAM 203. The illegal-copy-recognition unit 207 checks and judges in step 301 whether reproduction of the print-data is legally forbidden by referring to the data in the illegal-copy-data memory 208, and then sends the result of the judgement to the CPU 201.

In step 301B, the process branches to one of two steps 302 and 305 according to the judgement made by the illegal-copy-recognition unit 207. The process branches to the step 305 when the CPU 201 judges that reproduction of the print-data is legally forbidden.

In the step 305, the CPU 201 activates the image-processing unit 210 so as to alter the print-data in the RAM 203. The image-processing unit 210 alters the print-data utilizing various kinds of image-processing, as described above, so as to cause the fidelity of the reproduction of the print-data to be lost or deteriorated. In step 306, the CPU 201 activates the image-processing unit 210 again so as to add the identification code of the client-computer, which sent the print-data, to the above described altered print-data in the RAM 203.

In the step 302, the CPU 201 activates the image-processing unit 2 10 so as to convert the print-data, which is either the originally received data or the data altered in the steps 305 and 306, into image data. After the conversion, the image data is temporally stored in the RAM 203. In step 303, the CPU 201 sends the image data, accompanying the print-command, to the printing module 300. In step 304, the printing module 300 prints a visible image on a paper according to the image data, and outputs the printed paper as a hardcopy of the print-data, which is either the data as originally received from one of the client-computers A, B, C, or D, or the data as altered in the steps 305 and 306, depending upon the judgement made at the step 301.

Figure 4:
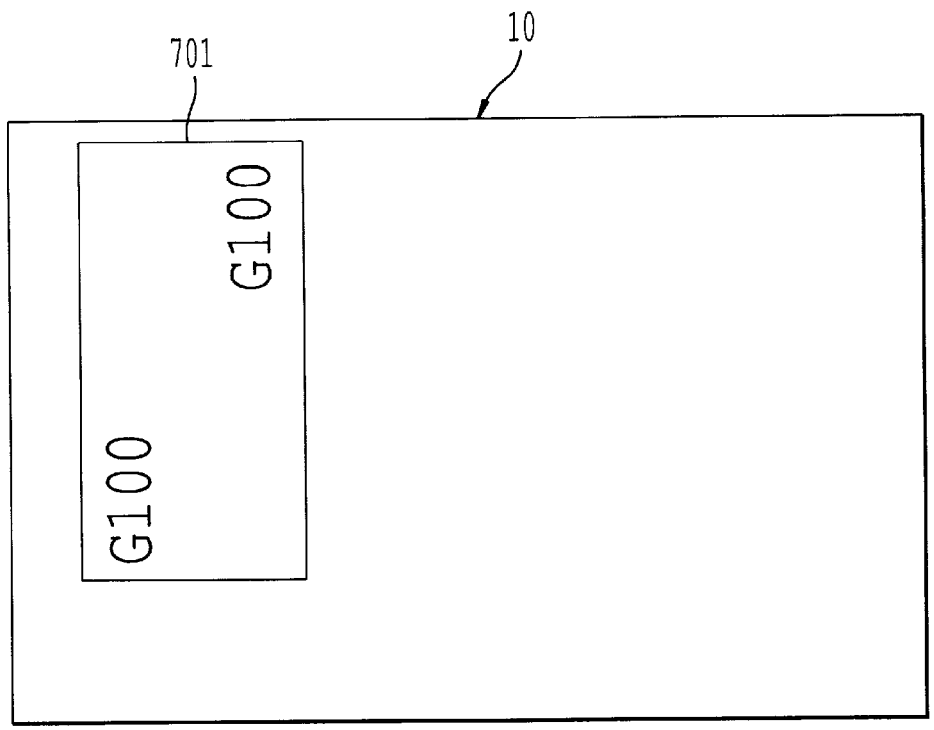
FIG. 4 is an illustration of an exemplary printed hardcopy of print-data reproduced without being altered.

FIG. 4 illustrates an example of a hardcopy of print-data, which is recognized as legally allowed to be printed at the step 301 described above. An image 701 is reproduced on a paper according to the print-data as received from one of the client-computers A, B, C, or D, without altering the received print-data.

Figure 5:
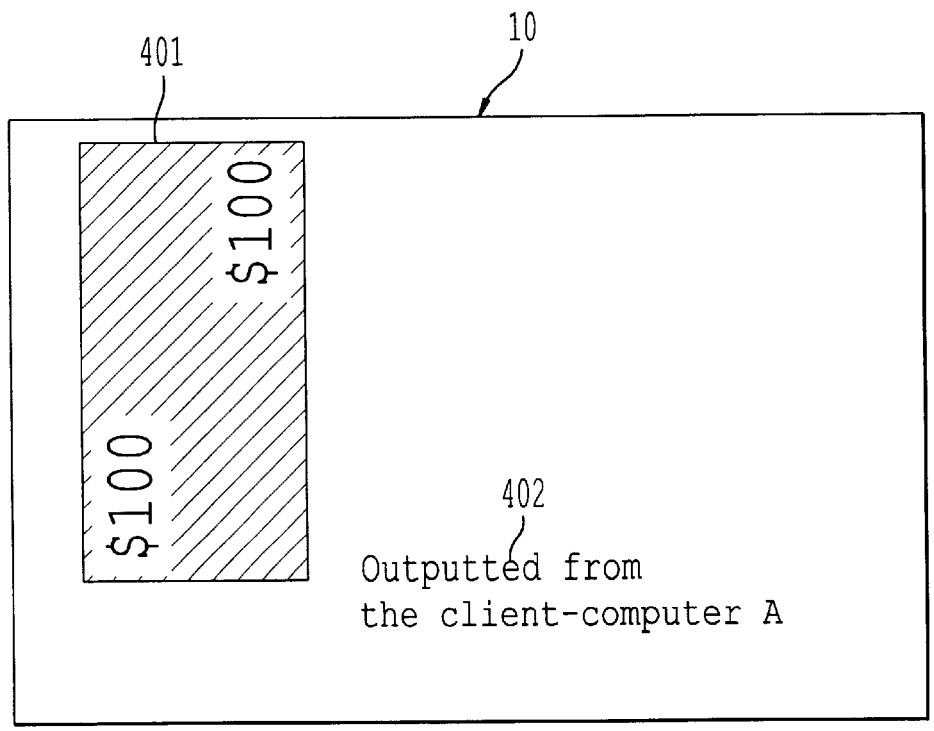
FIG. 5 is an illustration of an exemplary printed hardcopy of print-data reproduced after being altered.

FIG. 5 illustrates an example of a hardcopy of print-data, which is recognized as legally forbidden for reproduction at the step 301 described above. The characteristics of an image 401, such as the size, the background graphic pattern, the color, and so on, are similar to that of the image 701, except the text strings "$100". As illustrated in FIG. 5, however, the image 401 is made much darker than the image 701 and the fidelity of the reproduction is lost, and in addition, the outputted paper hardcopy 10 has an added image 402 indicating the identification code of the client-computer sending the print-data, i.e., "client-computer A", in this example. Accordingly, the client-computer sending the print-data of an article legally forbidden for reproduction is easily recognized.

Figure 6:
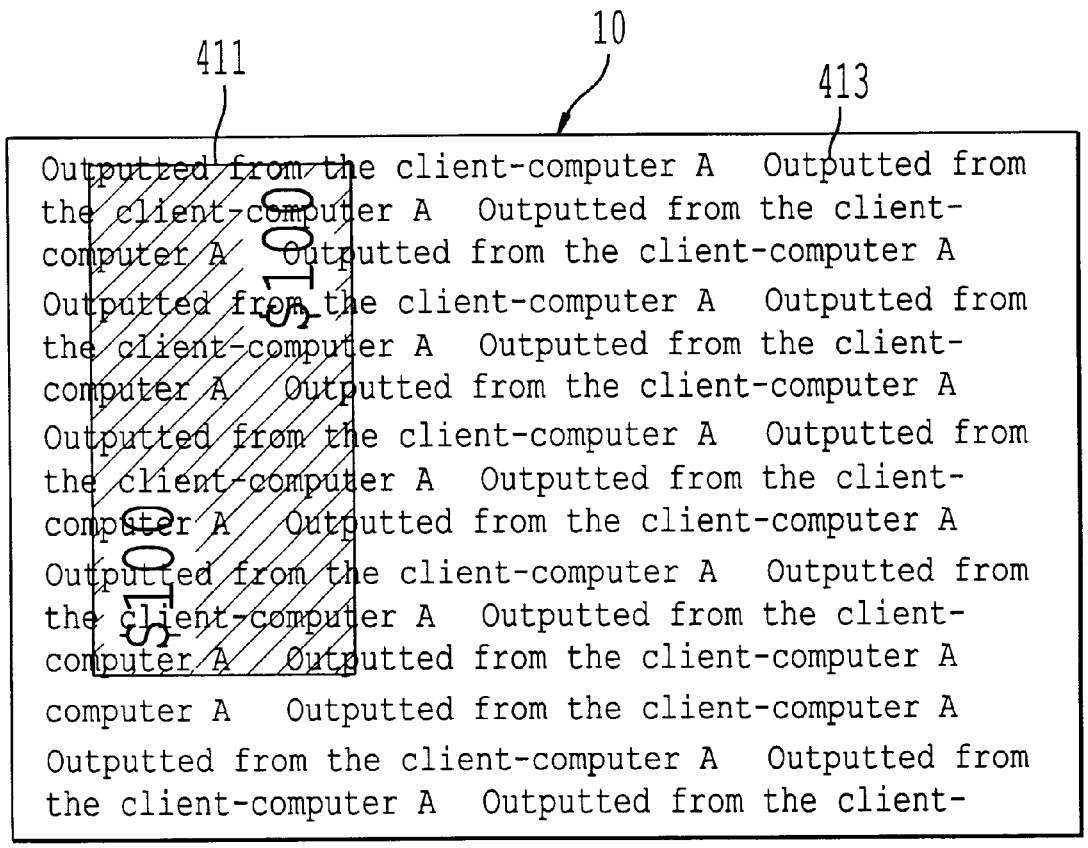
FIG. 6 is an illustration of another exemplary printed hardcopy of print-data reproduced after being altered.

FIG. 6 illustrates another example of a hardcopy of print-data that is recognized as legally forbidden for reproduction in the above step 301. In this example, an image 411 is reproduced according to the print-data with the fidelity of the reproduction being lost, and in addition, a plurality of images 413, each indicating the identification code of the client-computer sending the print-data, i.e., "client-computer A", are added in the outputted paper hardcopy 10. As illustrated in FIG. 6, the entire area of the paper 10 is filled with the images 413, such that the client-computer sending the print-data of an article whose reproduction is legally forbidden may be recognized more easily.

Figure 7A:
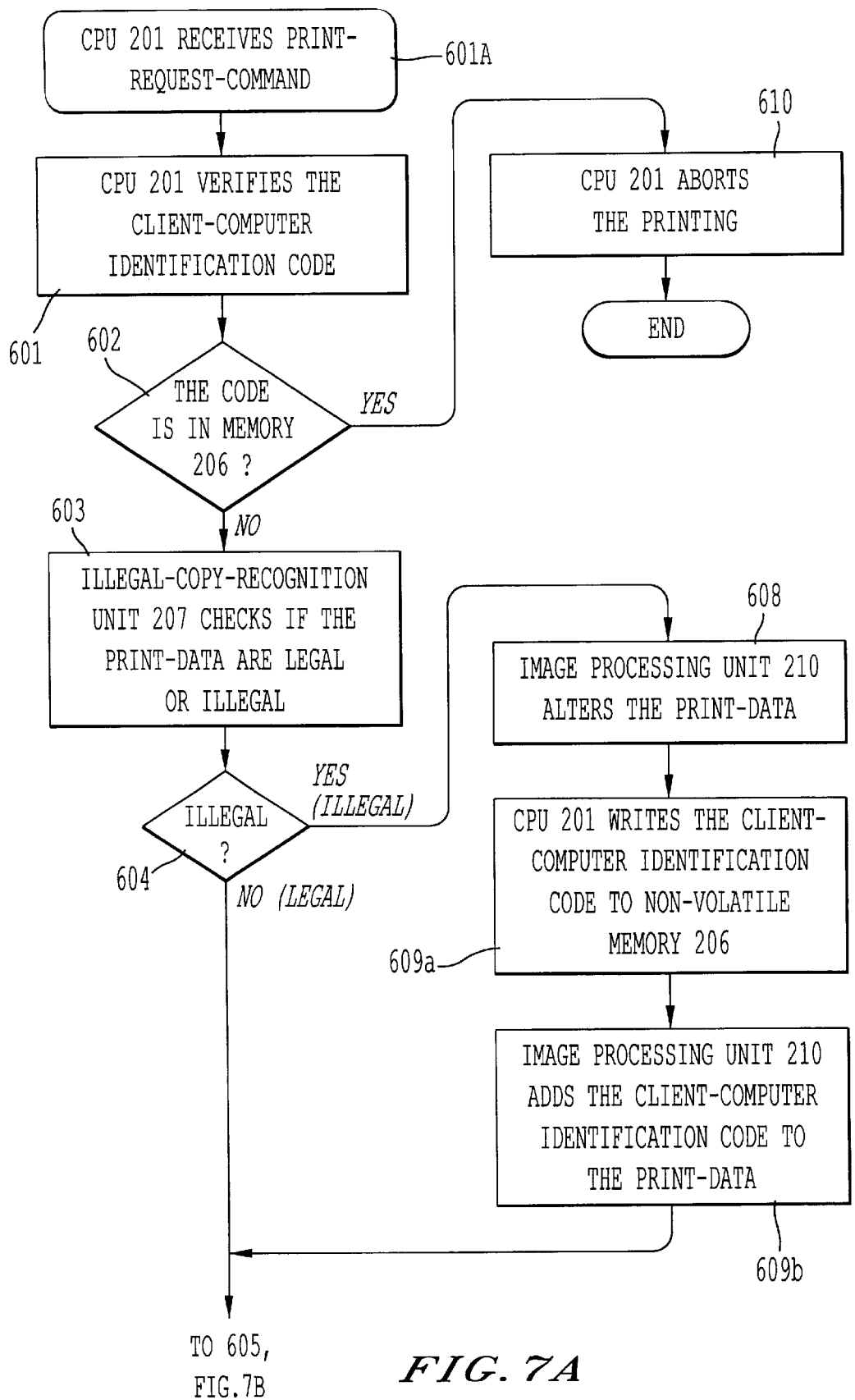
FIG. 7 is a flowchart illustrating an exemplary operation of altering print-data when reproduction of the print-data is legally forbidden, including steps for preventing outputting of hardcopies of print-data.
Figure 7B:
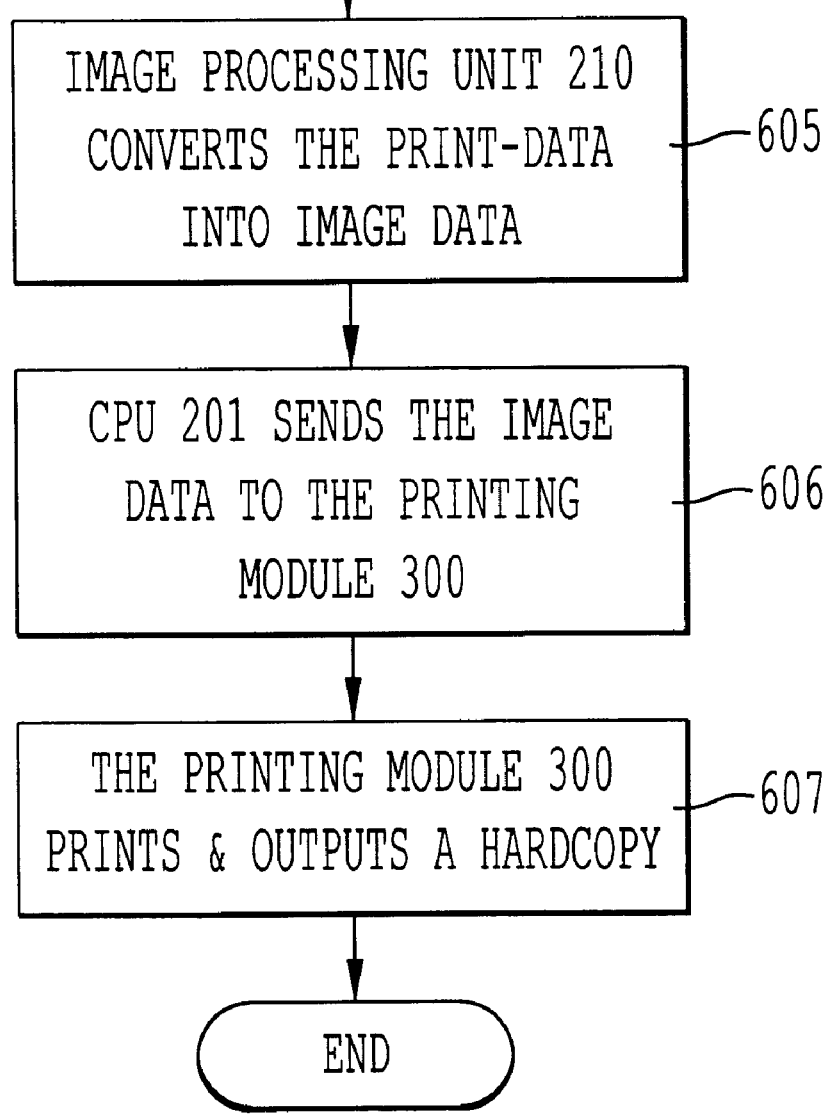

FIG. 7 illustrates another example of the operation of altering print-data when reproduction of the print-data is legally forbidden so as to lose the fidelity of the reproduction. The operation is invoked by the control module 200 when the control module 200 receives print-data accompanied by a print-request-command from one of the client-computers A, B, C, or D as a print-data-outputting apparatus. The print-data includes at least the identification code of the client-computer sending the print-data and the user identification code, as described above. The control module 200 temporarily stores the data in a predetermined allocated area of the RAM 203.

Referring to FIG. 7, in step 601, the CPU 201 verifies whether the client-computer identification code is already recorded in a predetermined location of the non-volatile-memory 206 as a client-computer that has once attempted to reproduce print-data legally forbidden for reproduction.

In step 602, the process branches to one of two steps 603 or 610 depending on the result of the verification in the step 601. The process branches to the step 610 when the client-computer identification code is already recorded in the predetermined location of the non-volatile-memory 206. In the step 610, the CPU 201 executes an aborting process for the requested printing operation after deleting the print-data that has been received from the client-computer and stored in the RAM 203.

In the step 603, the CPU 201 activates the illegal-copy-recognition unit 207 so as to verify the print-data in the RAM 203. The illegal-copy-recognition unit 207 checks and judges in the step 603 whether reproduction of the print-data is legally forbidden by referring to the data in the illegal-copy-data memory 208, and then sends the result of the judgement to the CPU 201.

In step 604, the process branches to one of two steps 605 and 608 according to the judgement made by the illegal-copy-recognition unit 207. The process branches to the step 608 when the CPU 201 judges that reproduction of the print-data is legally forbidden. In the step 608, the CPU 201 activates the image-processing unit 210 so as to alter the print-data in the RAM 203. The image-processing unit 210 alters the print-data utilizing various kinds of image-processing, as described above, so as to cause the fidelity of the reproduction of the print-data to be lost or deteriorated. In step 609a, the CPU 201 writes the identification code of the client-computer, which sent the print-data, into the predetermined location of the non-volatile-memory 206 as a record of the client-computer having attempted to reproduce an article whose reproduction is legally forbidden. In step 609b, the CPU 201 activates the image-processing unit 210 again so as to add the identification code of the client-computer that sent the print-data to the already altered print-data in the RAM 203, described above.

In the step 605, the CPU 201 activates the image-processing unit 210 so as to convert the print-data. The print which is either the originally received data or the data altered in the steps 608, 609a, and 609b, into image data. In step 606, the CPU 201 sends the image data, accompanying the print-command, to the printing module 300. In step 607, the printing module 300 prints a visible image on a paper according to the image data, and outputs the printed paper as a hardcopy of the print-data, which is either the data as originally received from one of the client-computers A, B, C, or D, or the data as altered in steps 608, 609a, and 609b, depending upon the judgement at the step 603.

As described above, when print-data for printing is sent from a client-computer having record of attempting reproduction of an article whose reproduction is legally forbidden and hose identification code is not recorded in the non-volatile-memory 206 and when the print-data is judged to be legally allowed for reproduction, the print-data is not altered and a hardcopy according to the unaltered print-data is outputted, for example, as shown in FIG. 4.

When print-data for printing is sent from a client-computer having no record of attempting the reproduction of an article whose reproduction is legally forbidden and whose identification code is not recorded in the non-volatile-memory 206 but the print-data for printing is judged to be legally forbidden for reproduction, the print-data is altered such that a hardcopy of the print-data is reproduced with the fidelity of the reproduction being lost or deteriorated, and an image indicating the identification code of the client-computer sending the print-data, i.e., "client-computer A", is added for example, as illustrated in FIG. 5. Once a client-computer has attempted reproduction of an article legally forbidden for reproduction and the identification code is recorded in the non-volatile-memory 206, optionally a hardcopy of the other print-data transmitted with that identification code is prevented from being outputted, even when reproduction of the print-data for printing is legally allowed, until a manual reset by an authorized technician is performed.

Figure 8A:
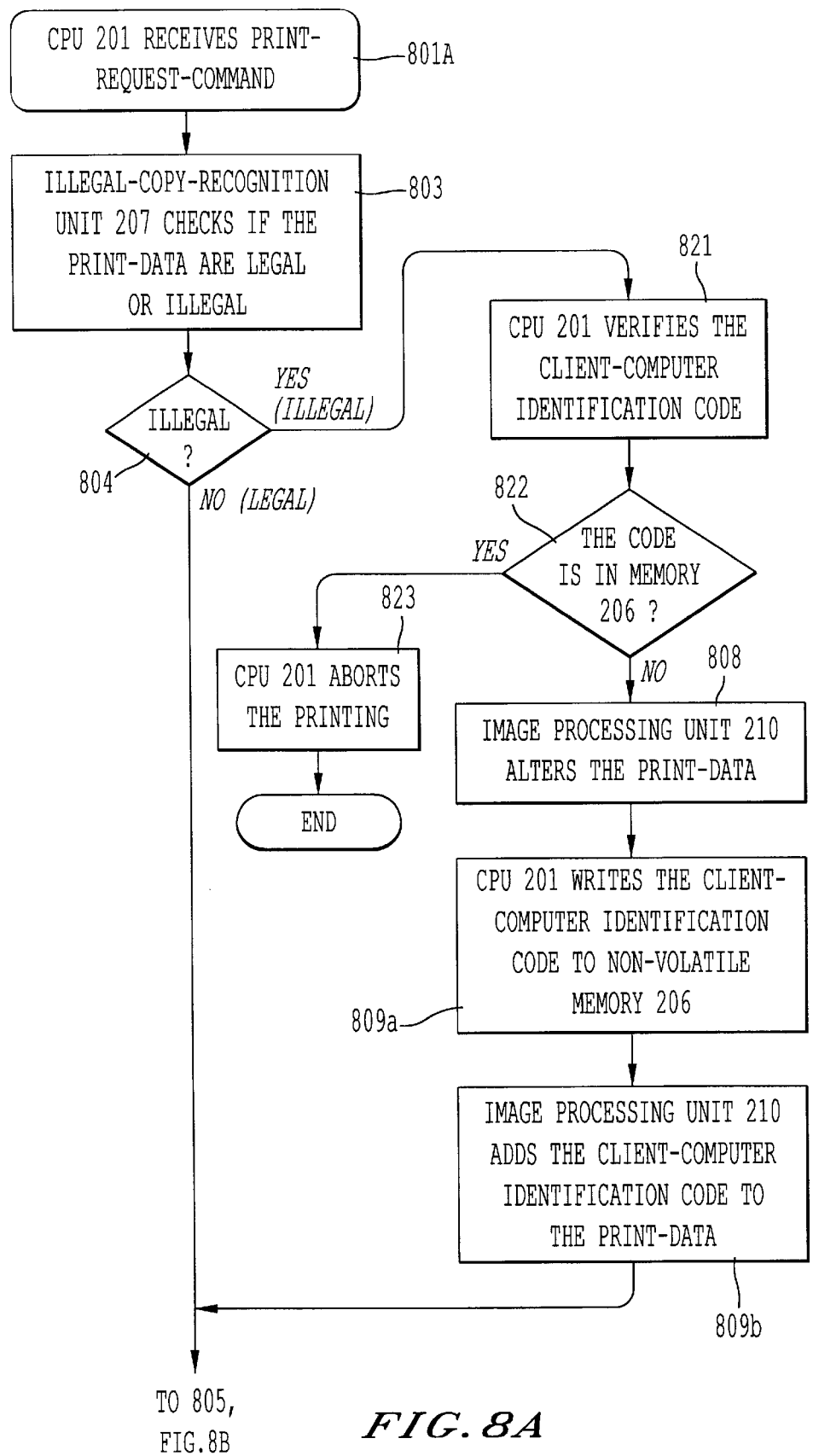
FIG. 8 is a flowchart illustrating another exemplary operation of altering print-data when the print-data is legally forbidden to be reproduced, including steps for preventing further outputting of hardcopies of print-data.
Figure 8B:
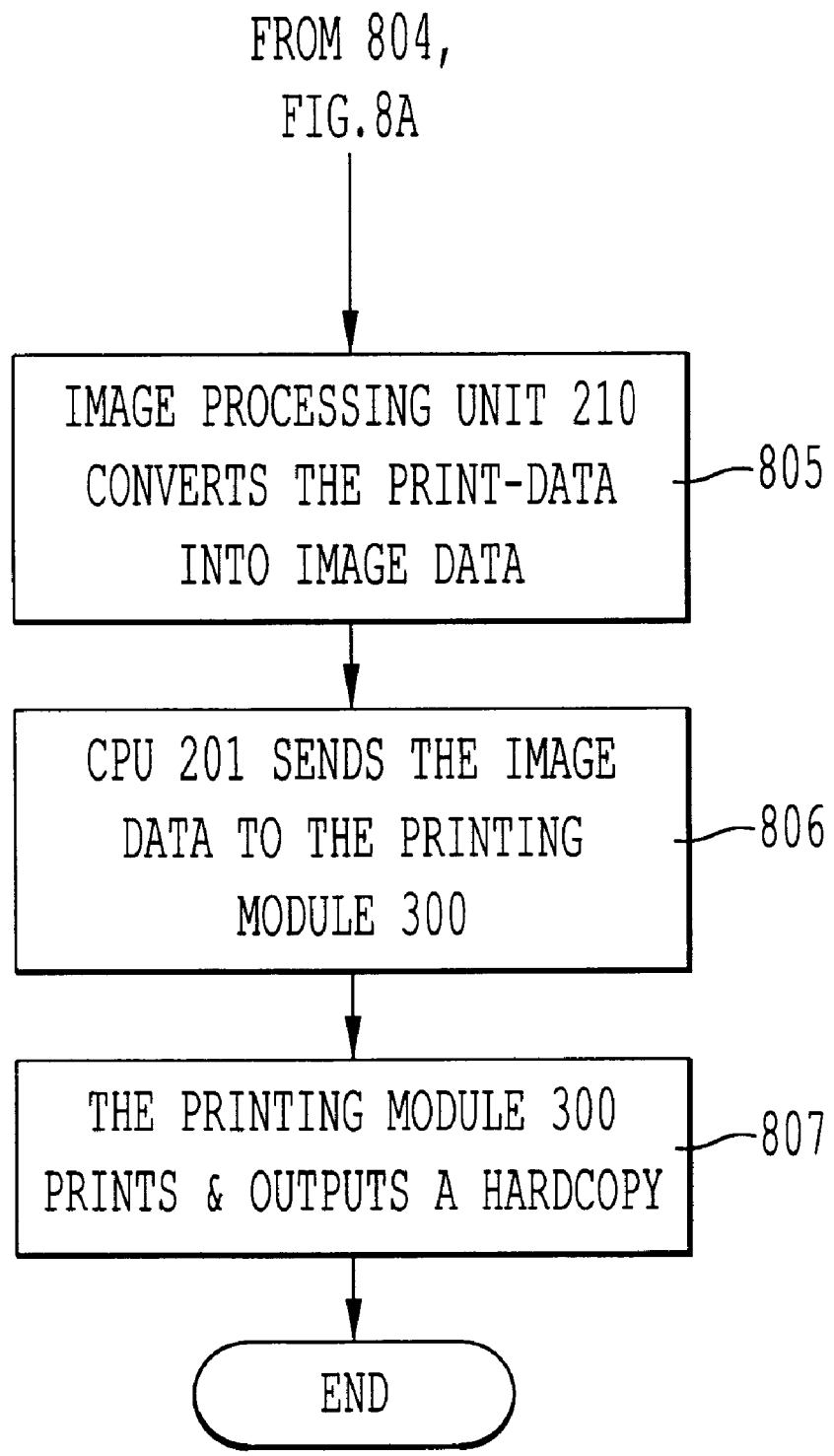

FIG. 8 illustrates still another example of operation of altering print-data when reproduction of the print-data is judged to be legally forbidden so that the fidelity of the reproduction is lost. The operation is invoked by the control module 200 when print-data, accompanying a print-request-command, the identification code of the client-computer sending the print-data, and others, is received from one of the client-computers A, B, C, or D.

Referring to FIG. 8, in step 803, the CPU 201 activates the illegal-copy-recognition unit 207 so as to verify the print-data in the RAM 203. The illegal-copy-recognition unit 207 checks and judges in the step 803 whether reproduction of the print-data is legally forbidden by referring to the data in the illegal-copy-data memory 208, and then sends the result of the judgement to the CPU 201.

In step 804, the process branches to one of two steps 805 or 821 depending on the result of the judgement made by the illegal-copy-recognition unit 207. The process branches to step 821 when the CPU 201 judges that reproduction of the print-data is legally forbidden. In step 821, the CPU 201 verifies if the client-computer identification code is already recorded in a predetermined location of the non-volatile-memory 206 as a client-computer that has attempted to reproduce legally forbidden print-data. In step 822, the process branches to one of two steps 808 or 823 depending on the result of the verification in step 821. The process branches to step 823 when the client-computer identification code is already recorded in the predetermined location of the non-volatile-memory 206. In step 823, the CPU 201 executes an aborting process for the requested printing operation after deleting the print-data in the RAM 203 that has been received from the client-computer.

In the step 808, the CPU 201 activates the image-processing unit 210 so as to alter the print-data in the RAM 203. The image-processing unit 210 alters the print-data utilizing various kinds of image-processing, as described above, so as to cause the fidelity of the reproduction of the print-data to be lost or deteriorated. In step 809a, the CPU 201 writes the identification code of the client-computer, which sent the print-data, into the predetermined location of the non-volatile-memory 206 as a record of the client-computer having attempted to reproduce an article whose reproduction is legally forbidden. In step 809b, the CPU 201 activates the image-processing unit 210 again so as to add the identification code of the client-computer that sent the print-data, to the already altered print-data in the RAM 203 described above.

In the step 805, the image-processing unit 210 converts the print-data, which is either the originally received data or the data as altered in the steps 808 and 809, into image data. In step 806, the CPU 201 sends the image data, accompanying the print-command, to the printing module 300. In step 807, the printing module 300 prints a visible image on a paper according to the image data, and outputs the printed paper as a hardcopy of the print-data, which is either the data as originally received from one of the client-computers A, B, C, or D, or the data as altered in the steps 808, 809a, and 809b, depending upon the judgement made at the step 803.

As described above, in this example, when reproduction of the print-data is judged to be legally allowed, even if the print-data has been sent from a client-computer whose identification code is recorded in the non-volatile-memory 206 as an apparatus which has attempted to reproduce an article whose reproduction is legally forbidden, the hardcopy according to the print-data is normally reproduced. When print-data is sent from a client-computer having no record of attempting to reproduce an article whose reproduction is legally forbidden and whose identification code is not recorded in the non-volatile-memory 206 and when the print-data is judged as legally forbidden for reproduction, the print-data is altered such that a hardcopy according to the altered print-data is reproduced with the fidelity of the reproduction being lost or deteriorated, and an image indicating the identification code of the client-computer which sent the print-data, i.e., "client-computer A", for example, is added to the non-volatile memory 206, as illustrated in FIG. 5. When the client-computer which sent the print-data has a record of attempting to reproduce an article whose reproduction is legally forbidden and whose identification is recorded in the non-volatile-memory 206 and when reproduction of the print-data is judged to be legally forbidden, no hardcopy is outputted.

Figure 9:
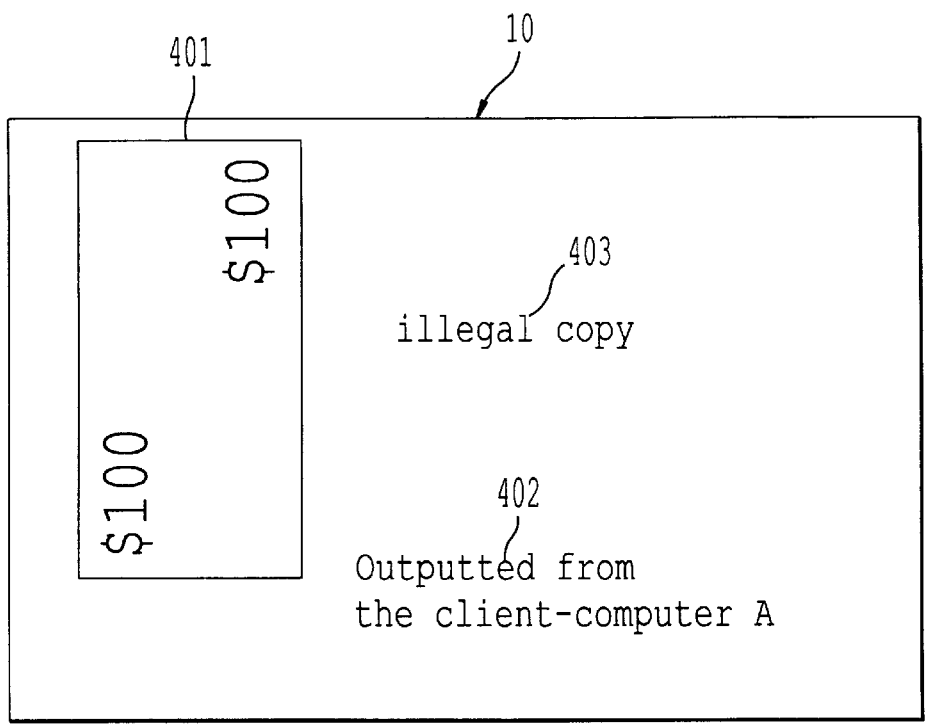
FIG. 9 is an illustration of another exemplary printed hardcopy of the print-data, in which an image of a message against counterfeiting is added.

An image of a more explicit message against counterfeiting, such as, for example, an image indicating, "illegal copy", can be also added at step 306 in FIG. 3, at step 609b in FIG. 7, or at step 809b in FIG. 8. FIG. 9 shows an example of a hardcopy of print-data in which an image 401 according to the print-data is reproduced with the fidelity of the reproduction being lost and in which, an image 402 indicating the identification code of the client-computer which sent the print-data i.e., "client-computer A" and another image 403 indicating that the reproduction of the print-data is illegal, i.e., "illegal copy", are added in this example. By adding such an image indicating that the reproduction is illegal, the hardcopy may be easily recognized as illegal reproduction and thereby, the client-computer having attempted the illegal reproduction is more easily recognized.

Figure 10:
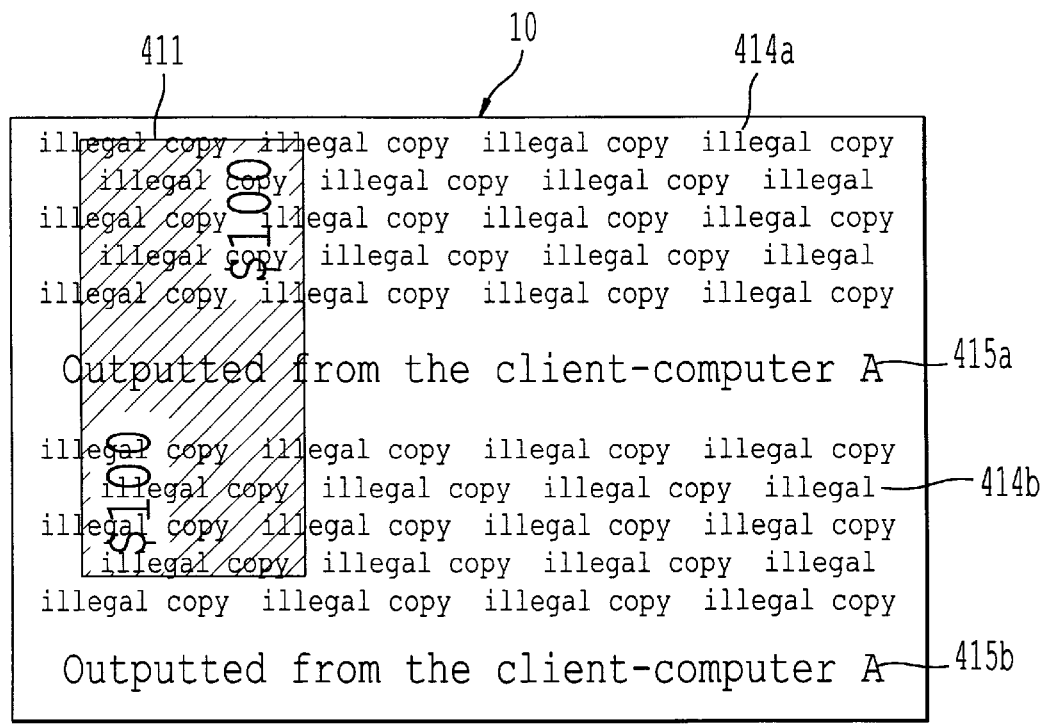
FIG. 10 is an illustration of still another exemplary printed hardcopy of the print-data, in which a plurality of images of a message against counterfeiting are added.

FIG. 10 shows another example of a hardcopy of print-data in which an image 411 according to the print-data is reproduced with the fidelity of the reproduction being lost and in which a plurality of images 414a and 414b indicating that the reproduction of the print-data is illegal, i.e., "illegal copy", and the identification code of the client-computer which sent the print-data, i.e., "client-computer A", respectively, are alternatively added.

Furthermore, the user identification code that is logged in the client-computer when sending print-data, which is legally forbidden for reproduction, can be added.

As described above, when print-data legally forbidden for reproduction is received by the image forming apparatus of the present invention, the apparatus prints in the output paper hardcopy an image indicating the identification code of the print-data-outputting apparatus which sent the print-data, so that the print-data-outputting apparatus having attempted outputting an illegal reproduction may be easily recognized.

Further, in the image forming apparatus of the present invention, as described above, a print-data-outputting apparatus, which has attempted outputting an illegal reproduction, can not output any further reproduction regardless of the legitimacy of the reproduction. Accordingly, the image forming apparatus of the present invention can effectively prevent articles whose reproduction is legally forbidden from being counterfeited with the apparatus.

Obviously, numerous additional modifications and variations of the present invention are possible in light of the above teachings. In particular, features described for certain embodiments may be employed in a logical manner to other embodiments described herein. It is therefore to be understood that within the scope of the appended claims, the present invention may be practiced otherwise than as specifically described herein.

What is claimed as new and is desired to be secured by Letters Patents of the United States:

1. An image forming apparatus for use in a network system including a network and at least one print-data-outputting apparatus, wherein each of said print-data-outputting apparatus sends via said network print-data including information regarding the print-data-outputting apparatus to the image forming apparatus for outputting a hardcopy of said print-data, the image forming apparatus comprising:
   print-data-receiving means for receiving print-data from said at least one print-data-outputting apparatus via the network;
   judging means for recognizing characteristics of said received print-data and judging whether reproduction of said received print-data is legally forbidden;
   image-processing means for altering said received print-data so as to cause the fidelity of the reproduction of the received print-data to be lost and adding to altered print-data identification information identifying the print-data-outputting apparatus sending the print-data;
   control means for activating said image-processing means, when said judging means judges said received print-data to be legally forbidden for reproduction, so as to alter said received print-data and add to said altered print-data said identification information; and
   printing means for printing an image of said altered print-data and said added identification information on a sheet of paper and outputting said sheet as a hardcopy.

2. The image forming apparatus according to claim 1, further comprising:
   memory means for storing information regarding the print-data-outputting apparatus ending print-data; and
   wherein, when the print-data received by said the print-data-receiving means is judged by said judging means as legally forbidden for reproduction, said control means stores said information regarding said print-data-outputting apparatus sending the print-data in said memory means and inhibits outputting a hardcopy of print-data subsequently received from said print-data-outputting apparatus.

3. The image forming apparatus according to claim 1, wherein said identification information includes an identification code of said print-data-outputting apparatus.

4. The image forming apparatus according to claim 1, wherein said identification information includes a user identification code that is logged in the print-data-outputting apparatus when print-data is sent by said print-data-outputting apparatus.

5. The image forming apparatus according to claim 1, wherein said control means controls said image-processing means to add said identification information to said altered print-data such that an image of said information is printed in an area outside of a printed image of said altered print-data in said hardcopy.

6. The image forming apparatus according to claim 1, wherein said control means controls said image-processing means to add said identification information to said altered print-data such that at least part of an image of said identification information is superimposed on an image of said altered print-data.

7. The image forming apparatus according to claim 1, wherein said control means controls said image-processing means to add said identification information to said altered print-data such that a plurality of images of said information regarding said print-data-outputting apparatus are printed across said hardcopy.

8. An image forming apparatus for use in a network system including a network and at least one print-data-outputting apparatus, which sends via the network print-data including information regarding the print-data-outputting apparatus to said image forming apparatus for outputting a hardcopy of said print-data, said image forming apparatus comprising:

print-data-receiving means for receiving print-data from each of said print-data-outputting apparatus via said network;

judging means for recognizing characteristics of said received print-data and judging whether reproduction of said received print-data is legally forbidden;

memory means for storing information regarding a print-data-outputting apparatus sending print-data;

printing means for printing an altered image of received print-data as a hardcopy; and control means for storing information regarding the print-data-outputting apparatus sending print-data in said memory means when print-data received from said print-data-outputting apparatus is judged by the judging means to be legally forbidden for reproduction and for printing, via the printing means, an altered image of the received print-data and for inhibiting further outputting of a hardcopy of print-data subsequently received from said print-data-outputting apparatus until the occurrence of a specific event.

9. An image forming apparatus for use in a network system including a network and a plurality of print-data-outputting apparatuses, wherein each of said plurality of print-data-outputting apparatuses sends via the network print-data including information regarding the print-data-outputting apparatus to said image forming apparatus for outputting a hardcopy of said print-data, said image forming apparatus comprising:

print-data-receiving means for receiving print-data from each of said plurality of print-data-outputting apparatuses via said network;

judging means for recognizing characteristics of said received print-data and judging whether reproduction of said received print-data is legally forbidden;

image-processing means for altering received print-data so as to cause the fidelity of a reproduction of said received print-data to be lost, adding to the altered print-data first information identifying the print-data-outputting apparatus sending the print-data, and second adding information indicating that reproduction of the print-data is legally forbidden;

control means for activating said image-processing means, when said judging means judges reproduction of received print-data to be legally forbidden, so as to alter said received print-data, add to said altered print-data said first information and said second information; and printing means for printing images of said altered print-data, and said added first and said added second information on a sheet of paper and outputting said sheet as a hardcopy.

10. An image forming apparatus for use in a network system including a network and a plurality of print-data-outputting apparatuses, wherein each of said plurality of print-data-outputting apparatuses sends via said network print-data including information regarding the print-data-outputting apparatus to said image forming apparatus for outputting a hardcopy of said print-data, said image forming apparatus comprising:

a print-data-receiving device configured to receive print-data from each of said plurality of print-data-outputting apparatuses via said network;

a judging device configured to recognize characteristics of said received print-data and to judge whether reproduction of said received print-data is legally forbidden;

an image-processing device configured to alter said received print-data so as to cause the fidelity of a reproduction of said received print-data to be lost and to add to said altered print-data identifying information identifying the print-data-outputting apparatus sending the print-data;

a control device configured to activate said image-processing device, when said judging device judges reproduction of said received print-data to be legally forbidden, so as to alter said received print-data and add to said altered print-data said identification information; and a printing device configured to print an image of said altered print-data and an image of said added identification information on a sheet of paper and outputting said sheet as a hardcopy.

11. The image forming apparatus according to claim 10, further comprising:

a memory device configured to store information regarding the print-data-outputting apparatus sending print-data; and wherein, when reproduction of the print-data received by said print-data-receiving device is judged by said judging device to be legally forbidden, said control device is configured to control storing of said identification information identifying the print-data-outputting apparatus sending said print-data in said memory device and inhibits further outputting of a hardcopy of print-data subsequently received from said print-data-outputting apparatus until the occurrence of a specific event.

12. The image forming apparatus according to claim 10, wherein said identification information includes an identification code of said print-data-outputting apparatus.

13. The image forming apparatus according to claim 10, wherein said identification information includes a user identification code that is logged in said print-data-outputting apparatus when print-data is sent by the print-data-outputting apparatus.

14. The image forming apparatus according to claim 10, wherein said control device controls said image-processing device to add said identification information to said altered print-data such that an image of the identification information is printed in an area outside of a printed image of said altered print-data in the hardcopy.

15. The image forming apparatus according to claim 10, wherein said control device controls said image-processing device to add said identification information to said altered print-data such that a part of an image of the information is superimposed on an image of said altered print-data.

16. The image forming apparatus according to claim 10, wherein said control device is configured to control said image-processing device to add identification information to said altered print-data such that a plurality of images of the identification information are printed across the hardcopy.

17. An image forming apparatus for use in a network system including a network and a plurality of print-data-outputting apparatuses, each of the plurality of print-data-outputting apparatuses sending via the network print-data including information regarding the print-data-outputting apparatus to the image forming apparatus for outputting a hardcopy of the print-data, the image forming apparatus comprising:
   a print-data-receiving device that receives print-data from each of the plurality of print-data-outputting apparatuses via the network;
   a judging device that judges whether the received print-data is legally forbidden to be reproduced by recognizing characteristics of the received print-data;
   a memory device that stores the information regarding a print-data-outputting apparatus sending print-data;
   a printing device that prints an image of print-data as a hardcopy; and
   a control device that stores the information regarding the print-data-outputting apparatus sending print-data in the memory device when the print-data received from the print-data-outputting apparatus is judged by the judging device as legally forbidden to be reproduced and to print, via the printing device, an altered image of the received print-data and to inhibit outputting a hardcopy of print-data subsequently received from the print-data-outputting apparatus.

18. An image forming apparatus for use in a network system including a network and a plurality of print-data-outputting apparatuses, wherein each of said plurality of print-data-outputting apparatuses sends via said network print-data including information regarding the print-data-outputting apparatus to the image forming apparatus for outputting a hardcopy of the print-data, said image forming apparatus comprising:
   a print-data-receiving device configured to receive print-data from each of said plurality of print-data-outputting apparatuses via said network;
   a judging device configured to recognize characteristics of the received print-data and to judge whether reproduction of the received print-data is legally forbidden;
   an image-processing device configured to alter the received print-data so as to cause the fidelity of a reproduction of the received print-data to be lost, to add to said altered print-data first information identifying the print-data-outputting apparatus sending the print-data, and to add second information indicating that reproduction of the print-data is legally forbidden;
   a control configured to activate said image-processing device, when said judging device judges reproduction of the received print-data to be legally forbidden, so as to alter the received print-data and to add to said altered print-data said first information and said second information; and
   a printing device configured to print images of said altered print-data, said first information and said second information on a sheet of paper and outputting said sheet as a hardcopy.

19. A network system comprising:
a network for transmitting data;
a plurality of print-data-outputting apparatuses, each of which outputs print-data including information regarding the print-data-outputting apparatus; and
an image forming apparatus comprising,
   a print-data-receiving device that receives print-data from each of said plurality of print-data-outputting apparatuses via said network,
   a judging device configured to recognize characteristics of the received print-data and to judge whether reproduction of the received print-data is legally forbidden,
   an image-processing device configured to alter received print-data so as to cause the fidelity of a reproduction of the received print-data to be lost and to add to said altered print-data identification information identifying the print-data-outputting apparatus sending the print-data,
   a control device configured to activate said image-processing device, when said judging device judges reproduction of the received print-data to be legally forbidden, so as to alter the received print-data and add to said altered print-data said identification information, and
   a printing device configured to print images of said altered print-data and said added identification information on a sheet of paper and outputting said sheet as a hardcopy.

20. A network system comprising:
a network for transmitting data;
a plurality of print-data-outputting apparatuses, each of which outputs print-data including information regarding the print-data-outputting apparatus; and
an image forming apparatus comprising,
   a print-data-receiving device configured to receive print-data from each of said plurality of print-data-outputting apparatuses via said network,
   a judging device configured to recognize characteristics of received print-data and to judge whether reproduction of the received print-data is legally forbidden,
   a memory device configured to store information regarding a print-data-outputting apparatus sending print-data,
   a printing device configured to print an image of print-data as a hardcopy, and
   a control device configured to store said identification information in said memory device when reproduction of the received print-data is judged by the judging device to be legally forbidden and to print, via the printing device, an altered image of the received print-data and to inhibit outputting of a hardcopy of print-data subsequently received from said print-data-outputting apparatus until the occurrence of a specific event.

21. A network system comprising:
a network for transmitting data;
a plurality of print-data-outputting apparatuses, each of which print-data-outputs print-data including information regarding the print-data-outputting apparatus; and
an image forming apparatus comprising,
  a print-data-receiving device that receives print-data from each of the plurality of print-data-outputting apparatuses via said network,
  a judging device configured to recognize characteristics of received print-data and to judge whether reproduction of the received print-data is legally forbidden,
  an image-processing device configured to alter the received print-data so as to cause the fidelity of a reproduction of the received print-data to be lost, to add to said altered print-data first information identifying the print-data-outputting apparatus sending the print-data, and to add second information indicating that reproduction of the print-data is legally forbidden,
  a control device configured to activate said image-processing device, when said judging device judges reproduction of the received print-data to be legally forbidden, so as to alter the received print-data and to add to said altered print-data said first information and said second, and
  a printing device configured to print images of said altered print-data, said added first information and said added second on a sheet of paper and outputting said sheet as a hardcopy.

22. An image forming method for an image forming apparatus used in a network system including a network and at least one print-data-outputting apparatus which sends via the network print-data including information regarding the at least one print-data-outputting apparatus to said image forming apparatus for outputting a hardcopy of said print-data, comprising the steps of:
  receiving print-data from said at least one print-data-outputting apparatus via the network;
  recognizing characteristics of the received print-data and judging whether reproduction of said received print-data is legally forbidden;
  altering said received print-data, when reproduction of said received print-data is judged to be legally forbidden, so as to cause the fidelity of a reproduction of said received print-data to be lost and adding to said altered print-data identification information identifying the print-data-outputting apparatus sending said print-data; and
  printing images of said altered print-data and said added identification information on a sheet of paper and outputting said sheet as a hardcopy.

23. An image forming method for an image forming apparatus used in a network system including a network and a plurality of print-data-outputting apparatuses, each of which sends via the network print-data including information identifying said print-data-outputting apparatus to said image forming apparatus for outputting a hardcopy of said print-data, comprising the steps of:
  receiving print-data from at least one of said plurality of print-data-outputting apparatuses via the network;
  recognizing characteristics of said received print-data and judging whether reproduction of the received print-data is legally forbidden;
  storing information regarding the print-data-outputting apparatus sending print-data when reproduction of the print-data received from said print-data-outputting apparatus is judged as legally forbidden;
  printing an altered image of said print-data as a hardcopy when printed-data received for the print-data-outputting apparatus is judged by the recognizing step to be legally forbidden for reproduction, and for inhibiting further outputting of a hardcopy of print-data subsequently received from said print-data-outputting apparatus until the occurrence of a specific event.

24. An image forming method for an image forming apparatus used in a network system including a network and a plurality of print-data-outputting apparatuses, wherein each of said plurality of print-data-outputting apparatuses sends via said network print-data including identification information identifying the print-data-outputting apparatus to said image forming apparatus for outputting a hardcopy of said print-data, comprising the steps of:
  receiving print-data from at least one of said plurality of print-data-outputting apparatuses via said network;
  recognizing characteristics of said print-data and judging whether reproduction of the received print-data is legally forbidden;
  altering said received print-data when reproduction of the received print-data is judged as legally forbidden, so as to cause the fidelity of the reproduction of the received print-data to be lost;
  adding to said altered print-data first identification information identifying the print-data-outputting apparatus sending said print-data, and adding second information indicating that reproduction of said print-data is legally forbidden; and
  printing images of said altered print-data, said first added information, and said second added information on a sheet of paper and outputting said sheet as a hardcopy.

25. A computer readable medium storing instructions for controlling an image forming apparatus used in a network system including a network and at least one print-data-outputting apparatus, which sends via said network print-data including identification information identifying said at least one print-data-outputting apparatus to said image forming apparatus for outputting a hardcopy of said print-data, by performing the steps of:
  receiving print-data from at least one of said plurality of print-data-outputting apparatuses via said network;
  recognizing characteristics of said received print-data and judging whether reproduction of the received print-data is legally forbidden;
  altering said received print-data when reproduction of said received print-data is judged to be legally forbidden, so as to cause the fidelity of a reproduction of said received print-data to be lost and adding to said altered print-data identification information identifying said at least one print-data-outputting apparatus sending said print-data; and
  printing images of said altered print-data and said added information on a sheet of paper and outputting said sheet as a hardcopy.

26. A computer readable medium storing instructions for controlling an image forming apparatus used in a network system including a network and a plurality of int-data-outputting apparatuses, each of the plurality of print-data-outputting apparatuses sending via the network print-data including information regarding the print-data-outputting apparatus to the image forming apparatus for outputting a hardcopy of the print-data, by performing the steps of:

receiving print-data from each of the plurality of print-data-outputting apparatuses via the network;

judging whether the received print-data is legally forbidden to be reproduced by recognizing characteristics of the received print-data;

storing information regarding a print-data-outputting apparatus sending print-data when the print-data received from the print-data-outputting apparatus is judged as legally forbidden to be reproduced;

printing an altered image of said print-data as a hardcopy when print-data received from the print-data-outputting apparatus is judged by the judging step to be forbidden for reproduction and for inhibiting outputting a hardcopy of print-data subsequently received from the print-data-outputting apparatus.

27. A computer readable medium storing instructions for controlling an image forming apparatus used in a network system including a network and a plurality of print-data-outputting apparatuses, each of which sends via the network print-data including identification information identifying the print-data-outputting apparatus to said image forming apparatus for outputting a hardcopy of said print-data, by performing the steps of:

receiving print-data from each of said plurality of print-data-outputting apparatuses via said network;

recognizing characteristics of said print-data and judging whether reproduction of the received print-data is legally forbidden;

altering the received print-data when reproduction of said received print-data is judged to be legally forbidden, so as to cause the fidelity of a reproduction of the received print-data to be lost, adding to said altered print-data first identification information identifying the print-data-outputting apparatus sending said print-data, and adding second information indicating that reproduction of said print-data is legally forbidden; and printing images of said altered print-data, said added first information, and said second information on a sheet of paper and outputting said sheet as a hardcopy.

28. An image forming method for a network system including a network, an image forming apparatus, and a plurality of print-data-outputting apparatuses, comprising the steps of:

sending print-data for outputting a hardcopy of print-data from each of said plurality of print-data-outputting apparatuses to said image forming apparatus via said network, including identification information identifying said print-data-outputting apparatus sending the print-data;

receiving print-data from each of said plurality of print-data-outputting apparatuses with said image forming apparatus via said network;

recognizing characteristics of said print-data and judging whether reproduction of the received print-data is legally forbidden;

altering the received print-data when reproduction of said received print-data is judged to be legally forbidden, so as to cause the fidelity of a reproduction of said received print-data to be lost and adding to said altered print-data identification information identifying the print-data-outputting apparatus sending the print-data to said image forming apparatus; and printing images of said altered print-data and said added identification information on a sheet of paper and outputting said sheet as a hardcopy with said image forming apparatus.

29. An image forming method for a network system including a network, an image forming apparatus, and a plurality of print-data-outputting apparatuses, comprising step of:

sending print-data for outputting a hardcopy of the print-data from each of the plurality of print-data-outputting apparatuses to the image forming apparatus via the network, including information regarding the print-data-outputting apparatus sending the print-data;

receiving the print-data from each of the plurality of print-data-outputting apparatuses with the image forming apparatus via the network;

judging whether the received print-data is legally forbidden to be reproduced by recognizing characteristics of the received print-data with the image forming apparatus; and storing information regarding a print-data-outputting apparatus sending print-data when the print-data received from the print-data-outputting apparatus is judged as legally forbidden to be reproduced;

printing an altered image of said print-data as a hardcopy when print-data received from the print-data-outputting apparatus is judged by the judging step to be forbidden for reproduction, and for inhibiting outputting a hardcopy of print-data subsequently received from the print-data-outputting apparatus with the image forming apparatus.

30. An image forming method for a network system including a network, an image forming apparatus, and a plurality of print-data-outputting apparatuses, comprising the steps of:

sending print-data for outputting a hardcopy of the print-data from each of said plurality of print-data-outputting apparatuses to said image forming apparatus via said network, including first identification information identifying the print-data-outputting apparatus sending the print-data;

receiving the print-data from each of said plurality of print-data-outputting apparatuses with said image forming apparatus via said network;

recognizing characteristics of said received print-data and judging whether reproduction of the received print-data is legally forbidden;

altering the received print-data when reproduction of the received print-data is judged to be legally forbidden, so as to cause the fidelity of a reproduction of the received print-data to be lost, adding to said altered print-data first identification information identifying the print-data-outputting apparatus sending the print-data, and adding second information indicating that reproduction of the print-data is legally forbidden with said image forming apparatus; and printing images of said altered print-data, said first added information, and said second added information on a sheet of paper and outputting said sheet as a hardcopy with said image forming apparatus.

* * * * *